(No Model.)
J. S. OSTRANDER.
FEED REGULATOR FOR LAMPS.
No. 304,278. Patented Aug. 26, 1884.
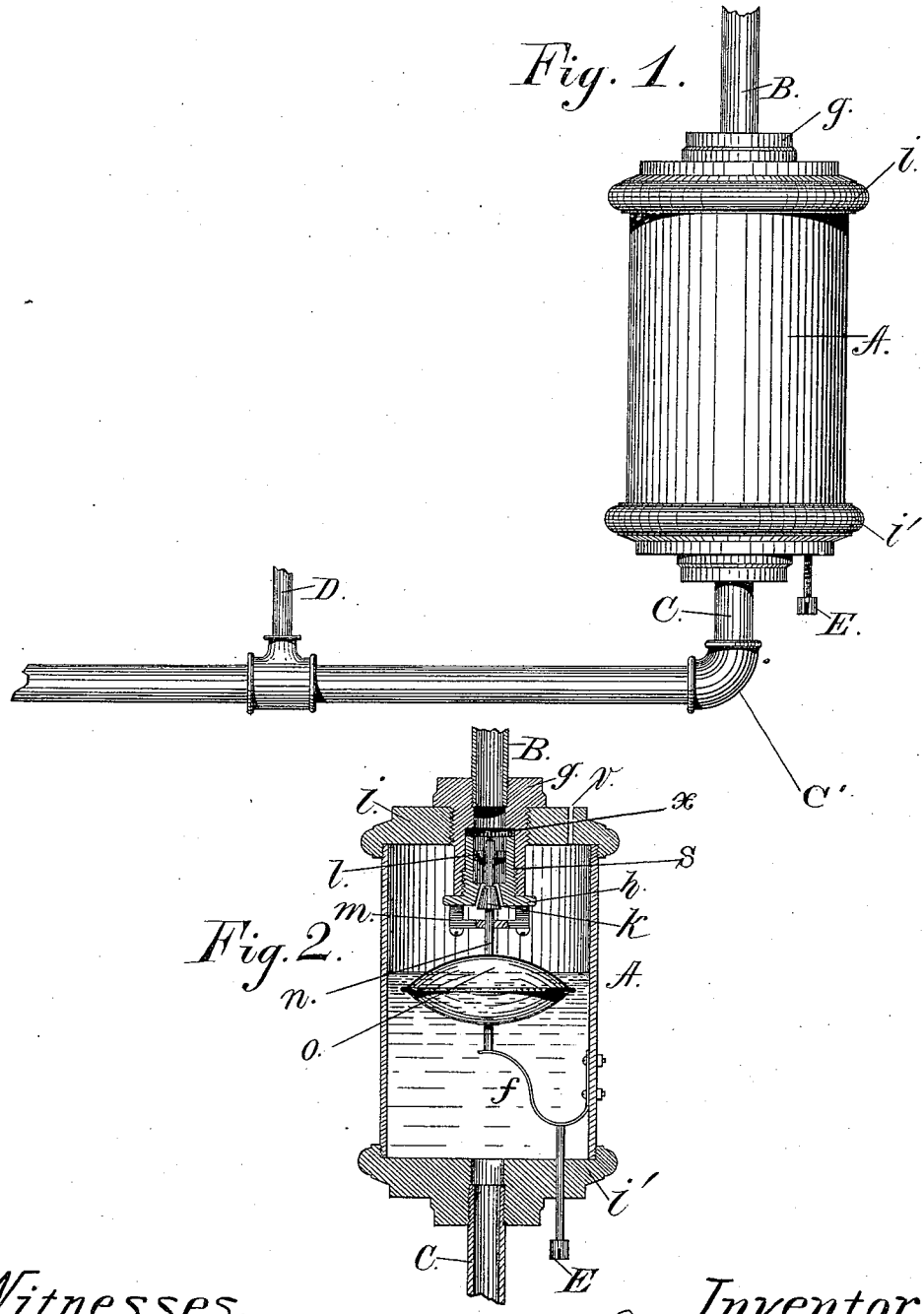
Witnesses,
Fred. F. Rost
C. T. Peck
Inventor,
James S. Ostrander
by W. J. Dennis
Attorney

UNITED STATES PATENT OFFICE.

JAMES S. OSTRANDER, OF RICHMOND, INDIANA.

FEED-REGULATOR FOR LAMPS.

SPECIFICATION forming part of Letters Patent No. 304,278, dated August 26, 1884.

Application filed October 20, 1883. (No model.)

*To all whom it may concern:*

Be it known that I, JAMES S. OSTRANDER, a citizen of the United States, residing at Richmond, in the county of Wayne and State of Indiana, have invented certain new and useful Improvements in Automatic Feed-Regulators for Lamps, of which the following is a specification, reference being had therein to the accompanying drawings.

My invention relates to that class of lamps in which the fluid to be burned is held in a reservoir or fountain, from which it flows to the lamp.

My invention consists in an arrangement of mechanical devices intended to regulate the flow of illuminating-fluids between the reservoir and the burner of a lamp.

In the drawings, Figure 1 is a view of my regulator, showing the supply-pipe, the discharge-pipe, and lamp-stem. Fig. 2 is a vertical section of the same, showing the operating mechanism in position.

A, Fig. 1, represents an inclosed cylinder, provided with a supply-pipe, B, and a discharge-pipe, C, a cap or cover, $i$, and bottom, $i'$. The discharge-pipe C is vertical at its connection with the cylinder A, and is provided with an elbow, C', to which is connected a horizontal extension of the discharge-pipe, provided with one or more vertical stems, D, to which lamps are attached.

$g$ is a screw-tap inserted in the central portion of the cover $i$ vertically, carrying the supply-pipe B. The screw-tap $g$ is made hollow at its lower end, forming a chamber into which the fluid is discharged from the supply-pipe B at the upper end of the chamber S, and at the lower end of the pipe B a wire-gauze strainer is placed horizontally, which prevents the admission of any foreign substances into the chamber S. A hollow nut, $h$, provided with a flange on its lower end, and engaged in a screw-thread on the inner surface of the lower portion of the screw-tap $g$, forms a portion of the chamber S. The lower surface or bottom of the hollow nut $h$ is provided with a circular opening at its center, which opening is made tapering, being larger in circumference on the under side than upon the upper, into which is fitted a conical valve, $k$, attached to and carried by a vertical valve-stem, $n$, upon which is also fixed an elliptical-formed float, $o$, occupying the lower portion of the space within the cylinder A.

$f$ is a curved spring attached to the side of the cylinder A, and extending inward to the center thereof, and receiving on its inner end the lower extremity of the valve-stem $n$, which it holds in the required position. A set-screw, E, passes through the bottom, $i'$, having a screw-thread in the same, by which the valve-stem $n$ is set higher or lower, so as to regulate the position of the valve $k$ and fix the maximum and minimum amount of flow from the chamber S. When the flow is greater than the lamp or lamps consume, the fluid accumulates in the lower portion of the cylinder A until it reaches a height where it comes in contact with the float $o$, when, in rising, it carries the float $o$ and valve-stem $n$, with the valve $k$, until the flow is either checked entirely or reduced to the amount that is required by the current consumption of the lamp or lamps that are attached to the discharge-pipe C. The upper end of the valve-stem $n$ works in a guide, $l$, secured horizontally in the upper end of the hollow nut $h$.

Having thus fully described my said improvement, what I claim as my invention, and desire to secure by Letters Patent, is—

In a feed-regulator for lamps, the combination of the cylinder A, provided with the cap $i$, the hollow screw-tap $g$, hollow nut $h$, screw $x$, valve-stem $n$, and float $o$, substantially as shown and described.

In testimony whereof I affix my signature in presence of two witnesses.

JAMES S. OSTRANDER.

Witnesses:
W. T. DENNIS,
JOHN T. DEAL.